United States Patent [19]

Huebscher

[11] 4,416,553

[45] Nov. 22, 1983

[54] TEMPERATURE-SENSING APPARATUS

[75] Inventor: David A. Huebscher, Maple Heights, Ohio

[73] Assignee: Noral, Inc., Cleveland, Ohio

[21] Appl. No.: 296,433

[22] Filed: Aug. 26, 1981

[51] Int. Cl.³ ........................... G01K 1/16; G01K 7/04
[52] U.S. Cl. .................................... 374/165; 374/179; 374/208
[58] Field of Search ............... 374/208, 188, 196, 183, 374/185, 179, 165; 338/25; 236/15 R

[56] References Cited

U.S. PATENT DOCUMENTS

| | | | |
|---|---|---|---|
| 2,962,898 | 12/1960 | Burling et al. | 374/196 |
| 3,282,107 | 11/1966 | Ekstrom, Jr. | 374/12 UX |
| 3,364,078 | 1/1968 | Ekstrom, Jr. | 136/221 |
| 3,570,312 | 3/1971 | Kreith | 374/183 |
| 3,690,176 | 9/1972 | Connolly et al. | 374/185 X |
| 4,241,289 | 12/1980 | Bowling | 219/450 |
| 4,321,827 | 3/1982 | Anderson | 374/165 X |
| 4,355,911 | 10/1982 | Tymkewicz | 374/208 X |

Primary Examiner—Daniel M. Yasich

Attorney, Agent, or Firm—Pearne, Gordon, Sessions, McCoy, Granger & Tilberry

[57] ABSTRACT

A temperature-sensing apparatus for a hand-held surface contact probe is disclosed wherein a hollow shank extends from a handle and a temperature-sensitive sensor means, such as a thermocouple, is mounted at the distal end of the shank. A ball and socket are provided at the end of the shank, the ball being secured to the end of the shank and the ball and socket having closely enveloping interengaging surfaces, each of high thermal conductivity. The conductors to the temperature sensor means are held in place by insulation which prevents the conductors from flexing so that they will not break due to such repeated flexing. The socket has a flat contact surface which is adapted to be pressed into contact with an object the temperature of which is to be measured and the heat flow path is from this contact surface through the interengaging surfaces of the ball and socket to the temperature sensor means. The ball and socket are relatively movable throughout a range of movement to accommodate slight hand-held movements of the handle or misalignment of the handle with an axis normal to the object's surface.

20 Claims, 2 Drawing Figures

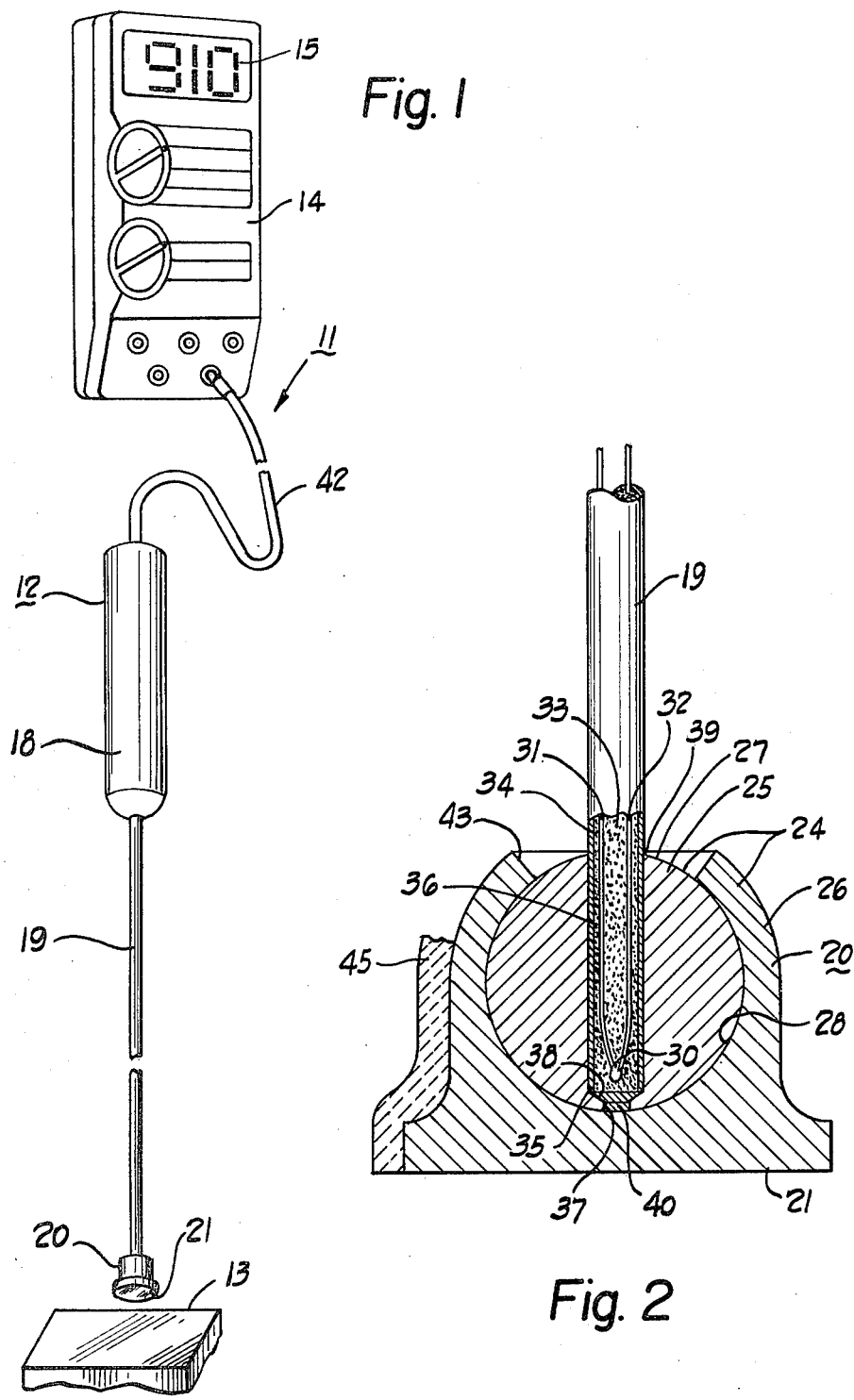

TEMPERATURE-SENSING APPARATUS

BACKGROUND OF THE INVENTION

Hand-held or manipulable temperature-sensing devices include at least two general types, the first type having a handle and a shank extending therefrom with a pointed end to be inserted within the mass the temperature of which is to be sensed. Where the mass is of metal, for example, or some other material which cannot be pierced, a surface-temperature-measuring probe is used as a second type of temperature-sensing device. This second type also has a handle and an extending shank, and has some form of blunt end or flat contact face to be pressed against the surface of the object, the temperature of which is to be sensed. Many of the devices of this second type utilize some form of spring which is stressed as the contact face is pressed against the object, the purpose of which is to have the contact face engage the object with a force within a predeterminable range.

A difficulty with this prior art second type of temperature probe is that the person operating the temperature probe cannot be positive that he is maintaining the contact face exactly flat with the object's surface except by touch or sight, and both are difficult where the object surface might be at the bottom of a depression or aperture in the object. Unless this contact face is flat against the object surface, then heat transfer from the object surface to the temperature sensor is greatly impeded, it takes much longer to reach a stable temperature reading on the temperature-sensing apparatus, and the chances are increased of there being an error in the temperature reading obtained by the operator because the temperature sensor did not reach the actual temperature of the object surface, or he did not allow sufficient time for the temperature-sensing apparatus to reach a peak reading.

The prior art has attempted to solve this problem by a structure shown in U.S. Pat. No. 3,282,107, wherein a universal joint is provided between a detector head and a shank with a thermocouple mounted within the detector head. However, then the conductor wires to the thermocouple had to be flexible and, upon repeated flexing, were subject to breakage.

Another attempt to solve generally this same problem was shown in U.S. Pat. No. 3,364,078, which had a flexible mounting of a thermocouple wherein the conductor wires to the thermocouple were resilient and an adjacent cradle block was resiliently supported by a leaf spring, yet, again, one could not be sure that the flat face of the thermocouple would be flat against the object surface.

Still another attempt was made in the prior art to meet this problem in a hand-held thermocouple probe sold by Alnor Instrument Co., Niles, Ill., Type 2545, wherein a ceramic head was cup-shaped and surrounded a thermocouple. The thermocouple extended slightly beyond the plane of the rim of the cup and was supported only by resilient conductor wires electrically connected to the thermocouple. The rim of the cup was adapted to be placed against the surface of the object the temperature of which was to be measured, and the ceramic head had a slightly loose connection with the shank of the hand-held probe. Again, this prior art construction had a deficiency that the resilient thermocouple wires were flexed as the temperature-sensing probe was pressed against the object surface, again causing repeated flexing which could result in breakage of the thermocouple wires.

SUMMARY OF THE INVENTION

The problem to be solved, therefore, is how to assure good surface-to-surface contact between a contact face of a hand-held temperature-sensing probe and the surface of the object the temperature of which is to be measured, yet assuring a long life and accurate temperature probe which is not subject to breakage of the conductor wires. This problem is solved by a temperature-sensing apparatus for detecting the temperature of a surface comprising, in combination, a temperature-sensitive sensor means, support means connected to said sensor means, a universal joint having first and second parts with first and second interengaged surfaces thereon, respectively, means connecting said first part to said support means, and a contact face adapted to engage a surface the temperature of which is to be sensed and connected to said second part whereby a heat flow path is through said contact face and said first and second interengaged surfaces to said sensor means.

The problem is further solved by a temperature sensing apparatus comprising, in combination, a hollow tubular shank having an end adapted to be held, a ball and closely enveloping socket having interengaging surfaces, means to secure one of said ball and said socket onto the distal end of said shank, a temperature-sensitive sensor means secured in said distal end of said shank, conductor means connected to said sensor means and extending through said shank, a contact surface on the distal end of the other of said ball and said socket adapted to be pressed into contact with an object the temperature of which is to be sensed with said ball and socket interengaging surfaces relatively movable to accommodate slight movements of said shank, and a heat flow path from the object being through said contact surface and the ball and socket interengaging surfaces to said sensor means.

The problem is further solved by a temperature-measuring device, comprising, in combination: a manipulable shank; a temperature responsive unit in said shank having conductor means connected thereto to develop a changing electrical condition on said conductor means with a change of temperature of said unit; a contact face adapted to be manipulably placed substantially in contact with an object the temperature of which is to be measured; and conductive path means having relatively sliding surfaces interconnecting said contact face and said temperature responsive unit.

Accordingly, an object of the invention is to provide a hand-held temperature-sensing probe with a universal joint.

Another object of the invention is to provide a hand-held temperature-sensing probe with a ball and socket joint, the socket having a flat face or a curved-to-fit face to engage the object and the external surface of the socket acting as a heat shield.

Still another object of the invention is to provide a ball and socket joint with closely interengaging surfaces and with heat flow from a contact face of the probe through these interengaging surfaces to the temperature sensor.

Other objects and a fuller understanding of the invention may be had by referring to the following description and claims, taken in conjunction with the accompanying drawing.

BRIEF DESCRIPTION OF THE DRAWING

FIG. 1 is a perspective view of a hand-held temperature sensing apparatus constructed according to the invention; and FIG. 2 is a longitudinal, sectional, enlarged view of the sensing head.

DESCRIPTION OF THE PREFERRED EMBODIMENT

FIGS. 1 and 2 illustrate a temperature-sensing apparatus 11 which embodies the invention. This apparatus 11 includes a hand-held probe 12 which is used for detecting the temperature of the surface of an object 13. The apparatus 11 includes the hand-held probe 12 and an instrument 14 which may contain the electronic circuit and battery power supply to measure the temperature of the surface of the object 13 and display such temperature on a display panel 15. The particular circuitry used with the apparatus 11 is not being claimed in this case and, accordingly, need not be described in detail. The hand-held probe 12 includes a support means or handle 18 with a shank 19 longitudinally extending therefrom. A sensing head 20 is on the distal end of this shank, and this sensing head has a contact face 21 which is adapted to be placed into surface contact with the object 13 to measure the temperature thereof.

FIG. 2 is an enlarged, partially sectional view of the internal construction of the sensing head 20. The sensing head 20 includes a universal joint 24 which is shown as a ball 25 and a socket 26. The ball 25 has an exterior spherical surface 27 and the socket 26 has an interior spherical surface 28. The ball 25 is closely received within this socket 26, and preferably the dimensions of the ball and socket surfaces 27 and 28 are closely held so that these interengaged surfaces provide good heat transfer therebetween.

A temperature-sensitive sensor 30 is disposed within the sensing head 20. In the preferred embodiment, this sensor is a thermocouple, such as a welded thermocouple junction between first and second conductors 31 and 32. One of these conductors may be the metallic shank 19, if a grounded type of thermocouple is to be constructed, but in this embodiment an ungrounded type is shown, with conductors 31 and 32 insulated from the shank 19. These conductors are held in place so that they do not flex during use of the probe 12, and this holding means includes insulation 33, which insulates the conductors from each other and from the walls 34 of the hollow, tubular shank 19. The distal end 35 of the shank 19 is contained within an aperture 36 in the ball 25. A smaller aperture 37 is provided in the lower end of the ball 25 in order to provide a shoulder 38 against which the end of the shank 19 may abut. The spherical surfaces 27 and 28 in the preferred embodiment are made of metal of high thermal conductivity, and to accomplish this, the entire ball 25 and socket 26 are preferably made of solid metal of high thermal conductivity. As an example, this may be nickel-silver or coin silver, which is an alloy about 92% silver. The hollow shank 19 may be made of stainless steel, and the insulation 33 may be powdered magnesium oxide which has been compressed to be practically a solid material by the subsequent reduction in diameter of this shank 19, after manufacture, to the desired diameter for use in the probe 12. The ball 25 is secured to the distal end 35 of the shank 19 by means providing high thermal conductivity and, in the preferred embodiment, this includes silver solder 39 between the shank 19 and the aperture 36, and also includes silver solder 40 filling the aperture 37 at the end of the shank 19. The contact face 21 is preferably ground to have a flat surface or a curved-to-fit surface for contact with the object 13 the temperature of which is to be measured. The conductors 31 and 32 may extend through the shank and handle 18 and be contained within a cable 42, which may be connected to the instrument 14.

In use, the probe 12 may be hand-held or machine manipulable, and the contact face 21 pressed against the object 13. The face 21 is ground flat to have a good transfer of heat through a conductive path from the object 13 into the universal joint 24. This universal joint is a ball and socket, with one of the ball and socket attached to the shank 19 and the other connected to the face 21. As shown in the preferred embodiment, the ball 25 is secured to the shank 19 and the contact face 21 is unitary with the socket 26. This establishes a heat flow path from the object 13 through the contact face 21, through the interengaged relatively sliding spherical surfaces 28 and 27, and through the silver solder 40, and a small amount of insulation 33 to the sensor 30. The temperature detector may have one terminal grounded to the shank 19 for faster temperature response, or, as shown, may have both terminals with separate, insulated conductors for complete electrical isolation. This sensor may be one of many types, such as a coil of wire, a thermistor, a heat-responsive semiconductor, or other resistance temperature detector, and in the preferred embodiment is a thermocouple. In all of these cases, the sensor is a temperature-responsive unit having two conductors connected thereto to develop a changing electrical condition on the conductors with a change of temperature of the unit.

It will be observed that the area of the interior spherical surface 28 which is contacted by the exterior spherical surface 27 of the ball 25 is an area greater than the circular area of the contact face 21. This is true even though the diameter of the ball 25 relative to the diameter of the circular contact face 21 has a ratio of 3:5. In one embodiment actually constructed in accordance with the invention, the silver ball 25 and a diameter of 0.15 inch, the contact face 21 had a diameter of 0.250 inch, and the socket 26 covered about three-fourths of the spherical area of the ball 25. Accordingly, even though the interengaging surfaces 27 and 28 are not soldered or held together but have a sliding engagement, there is very high thermal conductivity from the socket to the ball in order to readily transmit this heat along the heat flow or conductive path to the sensor 30. This sliding engagement is actually highly beneficial, because such movement of closely fitting spherical surfaces inhibits formation of oxidation or introduction of foreign matter, to maintain a very efficient conductive heat flow path.

If one is attempting to measure the temperature of the surface of an object which might be, for example, at 500° F. with a 70° temperature of the ambient air, then for the quickest response time and the least amount of error due to heat loss to the ambient, one desires to have the smallest practical thermocouple or sensor 30 and the smallest connecting conductors 31 and 32. There are still the boundary layer of air and any air movement along the surface of the object 13 to contend with which can introduce losses or errors into the system.

A more accurate way to measure the temperature of the surface of the object 13 would be to drill a small hole in the surface of the object and insert the thermocouple into that hole. This would greatly reduce any errors due to loss by heat reradiated from the thermocouple to the ambient air and would help to shield the thermocouple from any air movement. Instead of drilling a hole in the object, which is impractical, the present invention in effect achieves the same desired end by establishing, in effect, a small mesa on the surface of the object and then an aperture in this mesa into which the thermocouple is inserted. The mesa is formed by the socket 26, which, because of the ground, flat contact face 21, may be considered to have the socket as a mesa extending from the surface of the object 13. Then the aperture in the mesa is the internal spherical surface 28 into which the thermocouple 30 is inserted. Thus, the socket 26 acts as a heat shield, eliminating the boundary layer air at the thermocouple 30 and also reducing any heat flow to the ambient air from the thermocouple 30 and from the heat flow path mentioned above. With this heat shield, there is a minimum of loss due to radiation and convection of heat from the ball 25 to the ambient air. This action as a heat shield may be enhanced by an optional exterior ceramic coating 45 on the socket 26.

As one holds the hand-held probe 12 with the contact face 21 against the object 13, it will be seen that one's hand may move slightly in all directions about the center of the ball as a pivot point. This small movement is throughout a limited range determined by the edges 43 of the socket 26, yet this ball and socket joint will accommodate such slight movements of the operator's hand with the contact face 21 still remaining in flat engagement with the object 13. A slot may be cut in one side of the socket 26 to permit the shank to be turned up to 90° from the position shown in FIG. 2, for greater flexibility of positions of use.

In the preferred embodiment, this universal joint 24 has first and second parts, namely, the ball 25 and socket 26. The present invention solves the problem of breakage of the conductors 31 and 32 due to flexing, which could occur in the prior art constructions. In the present invention, the contact face 21 may change its attitude relative to the axis of the shank 19, yet there is no flexing of these conductors 31 and 32. Therefore, a long-lived and accurate temperature sensing apparatus is accomplished. By the use of an alloy of silver for the ball and socket 25, 26, there is achieved a good heat flow path through these interengaging surfaces 27 and 28, and the heat flow path remains a good heat flow path even if these interengaging surfaces should become oxidized or otherwise corroded. Any such corrosion will merely slightly slow the response time of the entire apparatus, but will not affect the accuracy of the final temperature reading. The fact that the socket 26 closely envelops most of the surface of the ball 25 assures that there will be a minimum of corrosion on these two spherical surfaces during use of the probe 12. Further, any such use will give a slight wiping action, tending to retard or eliminate any such corrosion.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A temperature-sensing apparatus adapted to be placed in contact with a surface for sensing the temperature of the surface comprising, in combination:
a temperature-sensitive sensor means;
manipulable support means connected to said sensor means;
conductor means connected to said sensor means and extending within said support means;
a universal joint having first and second parts with first and second interengaged surfaces thereon, respectively;
means connecting said first part to said support means to be manipulable therewith, said sensor means mounted towards an end of said connecting means near said first and second interengaged surfaces; and
a contact face adapted to engage a surface the temperature of which is to be sensed and connected to said second part whereby a heat flow path from the surface is through said contact face and said first and second interengaged surfaces to said sensor means, with said universal joint permitting said contact face to remain in engagement with the surface for a range of movement of said manipulable support means.

2. A temperature-sensing apparatus as set forth in claim 1, wherein said support means includes a handle and said connecting means being in the form of a shank extending therefrom, and said sensor means being mounted on the distal end of said shank.

3. A temperature-sensing apparatus as set forth in claim 1, wherein said interengaged surfaces are of metal having high heat conductivity.

4. A temperature-sensing apparatus as set forth in claim 1, wherein said first and second parts are of metal having high heat conductivity.

5. A temperature-sensing apparatus as set forth in claim 1, wherein said universal joint has an effective pivot point and said second part is movable in all directions throughout a limited range.

6. A temperature-sensing apparatus as set forth in claim 1, wherein said universal joint parts include a ball and socket.

7. A temperature-sensing apparatus as set forth in claim 1, wherein said universal joint parts include a heat shield for said heat flow path.

8. A temperature-sensing apparatus comprising, in combination:
a manipulable hollow tubular shank having an end adapted to be held;
a ball and closely enveloping socket having interengaging surfaces;
means to secure one of said ball and said socket onto the distal end of said shank to be manipulable therewith;
a temperature-sensitive sensor means secured in said distal end of said shank;
conductor means connected to said sensor means and extending through said shank;
a contact surface on the distal end of the other of said ball and said socket adapted to be pressed into contact with an object the temperature of which is to be sensed with said ball and socket interengaging surface relatively movable to accommodate slight movements of said manipulable shank; and a heat flow path from the object being through said contact surface and the ball and socket interengaging surfaces to said sensor means.

9. A temperature-sensing apparatus as set forth in claim 8, including means to hold said conductor means in said shank to inhibit flexing of said conductor means despite relative movements between said ball and socket.

10. A temperature-sensing apparatus as set forth in claim 9, wherein said holding means is insulation.

11. A temperature-sensing apparatus as set forth in claim 8, wherein said ball and socket interengaging surfaces are of metal of high thermal conductivity.

12. A temperature-sensing apparatus as set forth in claim 8, wherein said heat flow path transmits a majority of the heat flow to said sensor means.

13. A temperature-sensing apparatus as set forth in claim 8, wherein said securing means is silver solder.

14. A temperature-sensing apparatus as set forth in claim 8, wherein said ball is secured by said securing means to said shank.

15. A temperature-sensing apparatus as set forth in claim 14, wherein said socket acts as a heat shield for said heat flow path to said sensor means.

16. A temperature-sensing device adapted to be placed in contact with an object for sensing the temperature thereof, comprising, in combination:
a manipulable shank in a first means;
a temperature responsive unit in said shank manipulable therewith and having conductor means connected thereto to develop a changing electrical condition on said conductor means with a change of temperature of said unit:
a contact face on a second means;
said first means and said second means forming a heat conductive path means, said heat conductive path means supporting said contact face on said shank to be manipulably placed by said shank substantially in contact with an object the temperature of which is to be measured; and
said heat conductive path means having relatively sliding surfaces on said first and second means interconnecting said contact face and said temperature responsive unit.

17. A temperature-measuring device as set forth in claim 16 wherein said relatively sliding surfaces include a universal joint to conduct a temperature difference from said contact face to said unit.

18. A temperature-measuring device as set forth in claim 16, including a shield to inhibit radiation and convection heat loss or gain from said conductive path means.

19. A temperature-measuring device as set forth in claim 16, including insulation means to hold said conductor means from movement relative to said shank.

20. A temperature-measuring device as set forth in claim 16, wherein said sliding surfaces are of good heat conductive material and the sliding action inhibits oxidation of the surfaces.

* * * * *